United States Patent [19]

Paul nee Albertha B. Mitchell et al.

[11] E Re. 29,226

[45] Reissued May 17, 1977

[54] PREPARATION OF CARBOXYLATE AND SULFONATE SALTS OF 1-CIS-(3-CHLORO-2-PROPENYL)-3,5,7-TRIAZA-1-AZONIATRICYCLO(3.3.1.1$^{3,7}$)-DECANE-II

[75] Inventors: Albertha M. Paul nee Albertha B. Mitchell, Holliston, Mass.; Charles E. Moppett, Mystic, Conn.; Thomas P. Brady, Natick, Mass.

[73] Assignee: The Dow Chemical Company, Midland, Mich.

[22] Filed: Jan. 26, 1976

[21] Appl. No.: 652,608

Related U.S. Patent Documents

Reissue of:

[64] Patent No.: 3,862,940
Issued: Jan. 28, 1975
Appl. No.: 409,340
Filed: Oct. 24, 1973

[52] U.S. Cl. ..... 260/248.5; 424/249
[51] Int. Cl.$^2$ ..... C07D 251/72
[58] Field of Search ..... 260/248.5

[56] References Cited

UNITED STATES PATENTS 3,228,829 1/1966 Wolf et al. ..... 26/248 X

*Primary Examiner*—John M. Ford
*Attorney, Agent, or Firm*—Theodore Post; C. Kenneth Bjork

[57] ABSTRACT

Compounds of the [ formulas ] *formula*

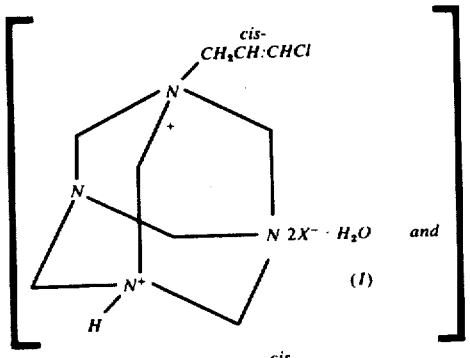

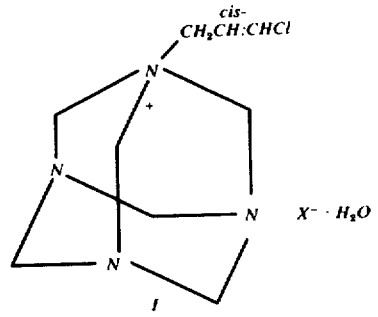

[(II)]

wherein $X^-$ is a lower alkyl carboxylate [ (I) ], a phenylcarboxylate [ (I) ], a lower alkylsulfonate [ (II) ] or a phenylsulfonate [ (II) ] anion, wherein the phenyl ring may have lower alkyl, lower alkoxy, hydroxyl, amino, nitro, bromo or chloro substitution. The compounds are prepared by reacting the [ carbinolamine ] *ring-opened intermediate*, prepared by reacting cis-1-(3-chloro-2-propenyl)-3,5,7-triaza-1-azoniatricyclo(3.3.1.1$^{3,7}$)decane chloride with aqueous sodium hydroxide, with a carboxylic or sulfonic acid, as indicated, to form the corresponding 1-cis-(3-chloro-2-propenyl)-3,5,7-triaza-1-azoniatricyclo(3.3.1.1$^{3,7}$)decane carboxylate or sulfonate. These compounds have antimicrobial activity.

14 Claims, No Drawings

PREPARATION OF CARBOXYLATE AND SULFONATE SALTS OF 1-CIS-(3-CHLORO-2-PROPENYL)-3,5,7-TRIAZA-1-AZONIATRICYCLO(3.3.1.1$^{3,7}$)DECANE-II

Matter enclosed in heavy brackets[ ]appears in the original patent but forms no part of this reissue specification; matter printed in italics indicates the additions made by reissue.

BACKGROUND OF THE INVENTION

The compound cis-1-(3-chloro-2-propenyl)-3,5,7-triaza-1-azoniatricyclo(3.3.1.1$^{3,7}$)decane chloride, known commercially as Dowicil® 200 antimicrobial, described in U.S. Pat. No. 3,228,829. Dowicil® 200 antimicrobial possesses inherent instability problems. Also, various salts of the N-methyl analog of Dowicil 200® are known, i.e., the nitrate, chlorate, sulfate, rhodanide, metaborate, bichromate, perchlorate, ferrocyanate and picrate; U.S. Pat. No. 1,336,709. No utility is claimed for these latter compounds, however.

SUMMARY OF THE INVENTION

This invention concerns mono- [and di-salts] *salts* corresponding to the [formulas] *formula*

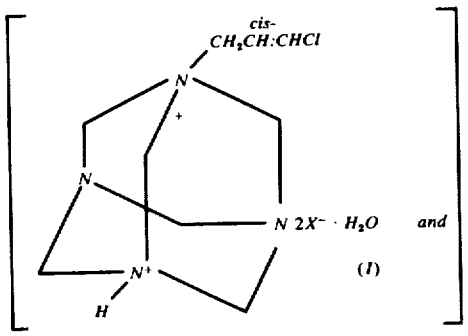

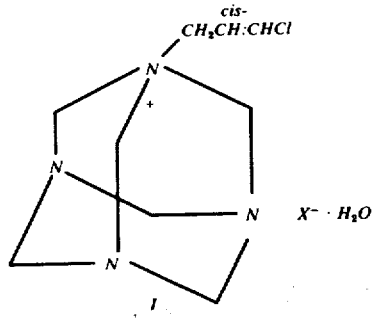

[(II)]

wherein $X^-$ represents a lower alkyl carboxylate, [(I)] a phenylcarboxylate [(I)] a lower alkyl sulfonate [(II)] or a phenylsulfonate [(II)] anion wherein the phenyl ring may have lower alkyl, lower alkoxy, hydroxyl, amino, nitro, bromo or chloro substitution, hereinafter designated "a phenyl" or "a benzene." In the specification and claims, "lower alkyl" and "lower alkoxy" designate a 1 to 4 carbon atom alkyl or alkoxy group, respectively.

The compounds are prepared by reacting Dowicil® 200 brand of cis-1-(3-chloro-2-propenyl)-3,5,7-triaza-1-azoniatricyclo(3.3.1.1$^{3,7}$)decane chloride, sometimes also referred to herein as "Cis," with excess aqueous sodium hydroxide at room temperature to give [the carbinolamine,] *a ring-opened, isolatable basic intermediate,* [7-cis-(3-chloro-2-propenyl)-1,3,5,7-tetraazabicyclo(3.3.1)-nonane-3-methanol,] hereinafter referred to as ["Carbinolamine,"] "*basic oil*". [according to the following reaction scheme:]

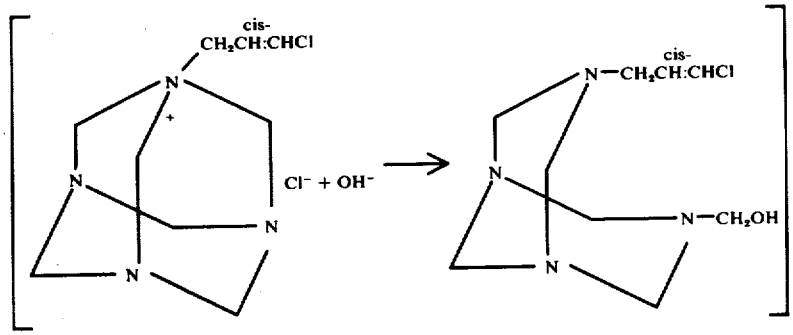

The [Carbinolamine] *basic oil* is recovered from the reaction medium by extraction with an inert neutral organic solvent such as ether or benzene, the extract is dried over sodium sulfate and the solvent is evaporated to give the [Carbinolamine] *basic oil* as a viscous oil.

The mono- [and di-] salts of the [Carbinolamin] *basic oil* are prepared by adding substantially one molar proportion of the *corresponding* sulfonic acid [or two molar proportions of the carboxylic acid, respectively,] in solution in an inert, neutral organic solvent, e.g., acetone, ether or benzene, to substantially one molar proportion of the [Carbinolamine] *basic oil* dissolved in a similar inert, neutral organic solvent. Upon stirring the reaction mixture at room temperature, a copious white precipitate forms which is easily isolated by filtration. It is dried to *give a crude* yield [a pure white] *of* mono- [or di-] salt. The structure is confirmed by elemental analysis and by N.M.R.

The following procedures and examples further describe the invention and the manner and process of making and using it so as to enable the art skilled to make and use the invention, and set forth the best mode contemplated by the inventors of carrying out the invention.

EXAMPLE 1

Preparation of the [Di-benzoate] *Mono-benzoate* Salt of Cis

A quantity of 80 g. (2.0 mole) NaOH was dissolved in 500 ml. $H_2O$ and cooled to room temperature. 100 Grams (0.4 mole) of Cis was added slowly to the caustic solution and the reaction mixture was stirred 15 minutes at ambient temperature. Product [Carbinolamine ] *basic oil* was extracted with benzene, dried over $Na_2SO_4$ and the benzene evaporated to give 72 g. (78% yield) of a viscous oil, the [ Carbinolamine ] *basic oil.*

10.0 Grams (0.043 mole) [ Carbinolamine ] *basic oil* was dissolved in 50 ml. of ether, then filtered through Celite® to give a clear, amber solution. 10.62 Grams (0.087 mole) benzoic acid in 100 ml. ether was added to the [ Carbinolamine ] *basic oil* solution at room temperature with stirring. In seconds, a copious white precipitate formed which was easily isolated by filtration, followed by drying to yield 18.0 g. (92% yield) of [ pure white Cis dibenzoate ] *mono-benzoate*, m.p. 70°–72° C. Elemental analysis and N.M.R indicated the [ bis-salt ] *mono-salt* had been prepared.

EXAMPLE 2

Preparation of the p-Toluene Sulfonate Mono-Salt of Cis

A quantity of 5.28 g. (0.021 mole) [ Carbinolamine ] *basic oil* was dissolved in 50 ml. cold ether, then filtered through Celite® to give a clear solution. 4.08 Grams (0.021 mole) p-toluene sulfonic acid was dissolved in 100 ml. ether, then added to the cold [ Carbinolamine ] *basic oil* solution (0° C.). A white crystalline precipitate formed immediately. After filtration and drying, the yield was 4 g. (ca. 50%), m.p. 125.5°–127° C. N.M.R. and elemental analysis indicated the titular product was prepared.

EXAMPLE 3

The following compounds [ Ia-Ii ] *Ia-Ij* [ and IIa ] were prepared by substituting the corresponding carboxylic or sulfonic acid in the procedure of Example 1 or Example 2 to obtain the indicated [ di- or ] mono-salt [ , respectively ] .

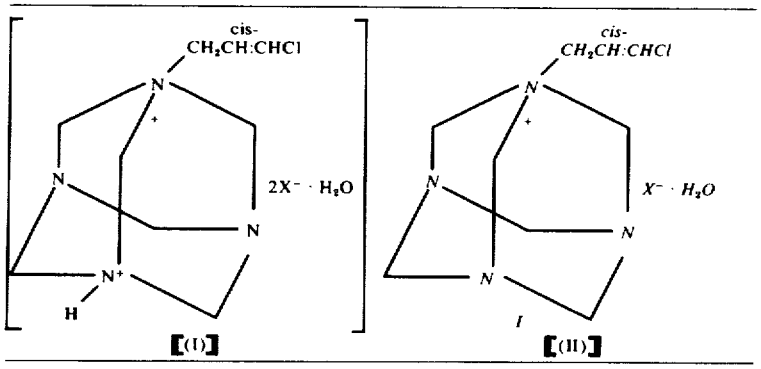

| X | m.p. ° C. |
|---|---|
| [ Ia. ortho-$HOC_6H_4COO$ | 95–97 ] |
| *Ia. ortho-$OHC_6H_4COO$* | *95–97* |
| Ib. para-$HOC_6H_4COO$ | 65–67 |
| Ic. para-$CH_3C_6H_4COO$ | 87–89 |
| Id. ortho-$NH_2C_6H_4COO$ | 66–67 |
| Ie. ortho-$NO_2C_6H_4COO$ | 97–99 |
| If. para-$ClC_6H_4COO$ | 96–96.5 |
| Ig. 2,4-$Cl_2C_6H_3COO$ | 98–100 |
| Ih. ortho-$BrC_6H_4COO$ | 40 |
| Ii. $CH_3COO$ | 25 |
| *Ij.* [ IIa. ] $CH_3SO_3$ | 120–121 |

The Compounds of the invention are useful as antimicrobials for the control of bacteria and fungi. This is not to suggest that the Compounds and their mixtures are equally effective against all such organisms at the same concentration. For such uses the Compounds or their mixtures can be employed in an unmodified form or dispersed on a finely divided solid and employed as dusts. Such mixtures can also be dispersed in water with the aid of a surface-active agent and the resulting emulsions employed as sprays. In other procedures, the products can be employed as active constituents in solvent solutions, oil-in-water or water-in-oil emulsions, including cosmetic emulsions. The augmented compositions are adapted to be formulated as concentrates and subsequently diluted with additional liquid or solid adjuvant to produce the ultimate treating compositions. Good results are obtained when employing compositions containing antimicrobial concentrations from about 100 or about 1,000 parts by weight of one or more of the compounds per million parts of such compositions.

Incorporation of the compounds of this invention into materials which are subject to bacterial and/or fungal attack inhibits the growth of such microbes and preserves the original value of the materials. The compounds are sufficiently nonvolatile and water-insoluble that they will persist on or in such materials for long periods of time. Examples of materials which are adversely effected by fungal growth are latex and alkyd paint films, wood and wooden products. The inventive compounds are sufficiently active against fungi that only small quantities are required to prevent mildew on paint films or wood rot. The compounds are therefore useful for long-term protection against fungal growth in or on materials having a wood basis or a protective or decorative paint film subject to fungal attack.

In representative operations, the products of the invention when tested for antimicrobial activity using conventional agar dilution tests gave complete growth inhibition against the following organisms at the indicated concentrations in parts per million:

| Compound of Example | Minimum Inhibitory Concentration, ppm | | | | | | | |
|---|---|---|---|---|---|---|---|---|
| | Sa | St | Aa | Pa | Cp | Sc | An | Pen |
| 1 | 100 | 50 | 100 | 250 | >500 | >500 | >500 | 500 |
| 2 | 250 | 50 | 100 | 250 | ± | ± | >500 | 500 |
| Ia | 100 | 50 | 100 | 250 | ± | ± | >500 | >500 |
| Ib | 75 | 50 | 75 | 250 | ∓ | ± | >500 | 500 |
| Ic | 100 | 100 | 100 | 250 | ± | 500 | >500 | 500 |
| Id | 250 | 50 | 250 | 250 | ∓ | 500 | >500 | 500 |
| Ie | 75 | 25 | 250 | 250 | >500 | >500 | >500 | >500 |
| If | 250 | 75 | 250 | 250 | 250 | 500 | 250 | 100 |
| Ig | 50 | 50 | 250 | 250 | >500 | >500 | >500 | ∓ |
| Ih | 250 | 75 | 250 | 250 | >500 | >500 | >500 | >500 |
| Ii | 250 | 50 | 250 | 250 | 250 | 500 | 500 | 100 |
| Ij [IIa.] | 250 | 75 | 75 | 250 | 500 | 500 | 500 | 250 |
| Cis* | 50 | 25 | 50 | 100 | ± | 250 | >500 | 250 |

*Dowicil® 200 antimicrobial
Sa = S. aureus
St = S. typhosa
Aa = A. aerogenes
Pa = P. aeruginosa
Cp = C. pelliculosa
Sc = S. cerevisiae
An = A. niger
Pen = P. chrysogenum
± = 50% inhibition at 500 ppm
∓ = >90% inhibition at 500 ppm

What is claimed is:

1. A compound corresponding to [ one of ] the [ formulas ] *formula*

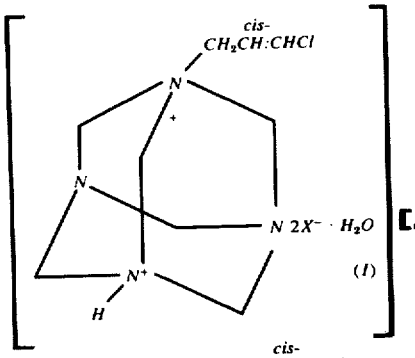

[*and*] (*I*)

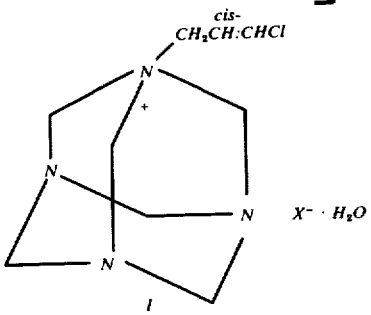

*I*

[*(II)*]

wherein X represents a lower alkyl carboxylate, [ (I) ] a lower alkyl sulfonate, [ (II) ] a benzoate [ (I) ] or a phenylsulfonate [ (II) ] salt wherein the phenyl group may contain lower alkyl, lower alkoxy, hydroxyl, amino, nitro, chloro or bromo substitution.

2. The compound of claim 1 represented by formula (I) wherein $X^-$ represents the benzoate anion.

3. The compound of claim 1 represented by formula [ (II) ] (*I*) wherein $X^-$ represents the p-toluene sulfonate anion.

4. The compound of claim 1 represented by formula (I) wherein $X^-$ represents the o-hydroxy benzoate anion.

5. The compound of claim 1 represented by formula (I) wherein $X^-$ represents the p-hydroxybenzoate anion.

6. The compound of claim 1 represented by formula (I) wherein $X^-$ represents the p-methylbenzoate anion.

7. The compound of claim 1 represented by formula (I) wherein $X^-$ represents the o-aminobenzoate anion.

8. The compound of claim 1 represented by formula (I) wherein $X^-$ represents the o-nitrobenzoate anion.

9. The compound of claim 1 represented by formula (I) wherein $X^-$ represents the p-chlorobenzoate anion.

10. The compound of claim 1 represented by formula (I) wherein $X^-$ represents the 2,4-dichlorobenzoate anion.

11. The compound of claim 1 represented by formula (I) wherein $X^-$ represents the o-bromobenzoate anion.

12. The compound of claim 1 represented by formula (I) wherein $X^-$ represents the acetate anion.

13. The compound of claim 1 represented by formula [ (II) ] (*I*) wherein $X^-$ represents the methyl sulfonate anion.

14. Method for making a carboxylate or a sulfonate salt of cis-1-(3-chloro-2-propenyl)-3,5,7-triaza-1-azoniatricyclo(3.3.1.1$^{3,7}$)decane which comprises adding to an inert, neutral organic solvent solution of [ 7 cis-(3-chloro-2-propenyl)-1,3,5,7-tetraazabicyclo-(3.3.1)-nonane-3-methanol ] *the reaction product of Dowicil®-200 with excess aqueous sodium hydroxide* at a temperature between about 0° C. and room temperature (a) substantially two molar proportions of a lower alkyl carboxylic acid, or a benzoic acid having lower alkyl, lower alkoxy, hydroxyl, amino, nitro, chloro or bromo substitution, or (b) substantially one molar proportion of a lower alkyl sulfonic acid or a benzene sulfonic acid, respectively, in an inert neutral organic solvent and recovering the said product from the reaction medium.

* * * * *

UNITED STATES PATENT AND TRADEMARK OFFICE

CERTIFICATE OF CORRECTION

PATENT NO. : Re. 29,226

DATED : May 17, 1977

INVENTOR(S) : Albertha M. Paul nee Albertha B. Mitchell, et al.

It is certified that error appears in the above-identified patent and that said Letters Patent are hereby corrected as shown below:

Column 1, line 16, "antimicrobial," should read --antimicrobial, is--.

Column 1, between lines 42 - 68 the formula should be drawn as follows:

--

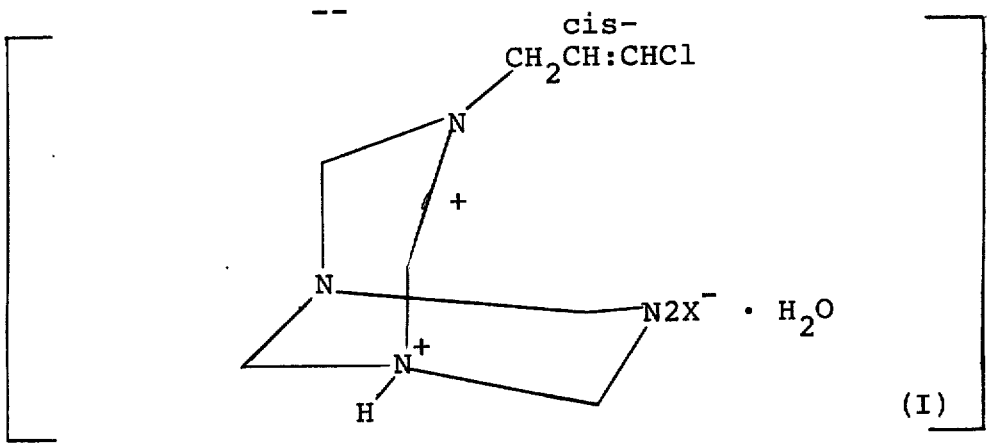

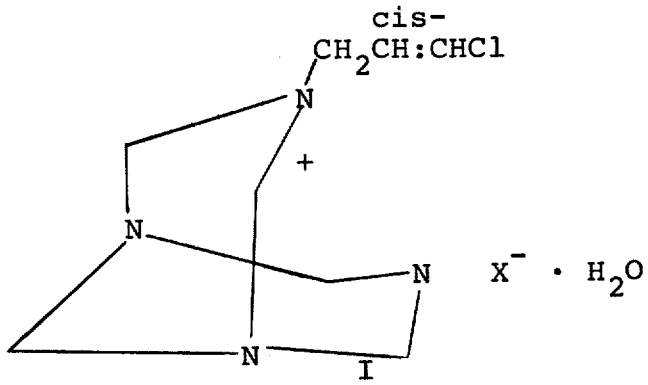

[(II)] --.

UNITED STATES PATENT AND TRADEMARK OFFICE

CERTIFICATE OF CORRECTION

PATENT NO. : Re. 29,226

DATED : May 17, 1977

INVENTOR(S) : Albertha M. Paul nee Albertha B. Mitchell, et al.

It is certified that error appears in the above-identified patent and that said Letters Patent are hereby corrected as shown below:

Column 2, line 41, "lamin]" should read --lamine]--.

Column 3, line 30, delete EXAMPLE 3.

Column 3, lines 35 - 65, "Ib. para-$HOC_6H_4COO$ 65-67" should read --Ib. [P]para-$HOC_6H_4COO$ 65-67--.

Signed and Sealed this

First Day of November 1977

[SEAL]

*Attest:*

RUTH C. MASON
*Attesting Officer*

LUTRELLE F. PARKER
*Acting Commissioner of Patents and Trademarks*